United States Patent
Lin et al.

(10) Patent No.: US 6,868,072 B1
(45) Date of Patent: Mar. 15, 2005

(54) HOME PHONE LINE NETWORK ARCHITECTURE

(75) Inventors: Thuji Simon Lin, Irvine, CA (US); Jeffrey D. Carr, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 09/525,872

(22) Filed: Mar. 15, 2000

Related U.S. Application Data

(60) Provisional application No. 60/125,174, filed on Mar. 19, 1999, and provisional application No. 60/125,292, filed on Mar. 19, 1999.

(51) Int. Cl.$^7$ .............................. H04L 5/14; H04J 3/16
(52) U.S. Cl. ..................... 370/276; 370/282; 370/467; 370/480
(58) Field of Search ............................. 370/351, 352, 370/282, 295, 276, 294, 431, 430, 441–443, 464–467, 469, 471, 478–480, 481–488, 490, 401

(56) References Cited

U.S. PATENT DOCUMENTS

| | | | | |
|---|---|---|---|---|
| 4,621,366 | A | 11/1986 | Cain et al. | 375/8 |
| 5,541,957 | A | 7/1996 | Lau | 375/258 |
| 5,561,468 | A | 10/1996 | Bryan et al. | 348/469 |
| 5,648,958 | A | 7/1997 | Counterman | 370/458 |
| 5,710,882 | A | 1/1998 | Svennevik et al. | 395/200.12 |
| 6,192,399 | B1 * | 2/2001 | Goodman | 725/78 |
| 6,587,454 | B1 * | 7/2003 | Lamb | 370/352 |

FOREIGN PATENT DOCUMENTS

| | | | |
|---|---|---|---|
| EP | 0 332 302 | 9/1989 | |
| EP | 0 596 645 | 5/1994 | |
| WO | WO 98/20649 | * 5/1998 | ......... H04L/12/413 |
| WO | WO 98/36538 | 8/1998 | |
| WO | WO 98/54859 | 12/1998 | |
| WO | WO 99/12330 | 3/1999 | |
| WO | WO 99/12330 | * 11/1999 | .......... H04M/11/06 |

OTHER PUBLICATIONS

Chow et al., "A Multi-drop In-house ADSL Distribution Network", Amati Communications Corporation, IEEE, 1994. pp. 456–460.*

Chow, P.S., et al., "A Multi-drop In-house ADSL Distribution Network," IEEE, May 1, 1994, pp. 456–460. (XP000438957).

* cited by examiner

*Primary Examiner*—Afsar Qureshi
(74) *Attorney, Agent, or Firm*—Christie, Parker & Hale, LLP

(57) ABSTRACT

Home phone line network devices, conforming to different versions of the standards, are interconnected and interoperable on a UTP transmission medium. Higher order devices support an overlaid dual logical network structure which allows two pairs of higher order devices to communicate simultaneously using two separate frequency bands. A higher order node contains a high speed PHY, a low speed PHY, and either a high and low order MAC or an enhanced MAC capable of supporting dual frequency band transmission, thereby enhancing total system throughput to the sum of the throughputs of each logical network.

27 Claims, 6 Drawing Sheets

HOME PHONE LINE NETWORK ARCHITECTURE

CROSS-REFERENCE TO RELATED APPLICATION

This application is related to and claims priority from provisional Application No. 60/125,174, filed Mar. 19, 1999 which claims benefit of 60/125,292 filed Mar. 19, 1999.

FIELD OF THE INVENTION

The present invention relates to high-speed data transmission over unshielded twisted pair home telephone wiring, and more particularly, to a system and method for providing compatibility devices operating in accordance with two different transmission standards.

BACKGROUND OF THE INVENTION

The Home Phone Line Network association (HomePNA) has established various standards which allows networking of communication devices the unshielded twisted pair wiring plant of an existing home telephone line installation. As with any networking technology, standards have been implemented in order to ensure interoperability between various equipment manufactures and reduce consumer concerns about obsolescence and compatibility. In this regard, many new digital appliances are contemplated that will exploit communication of voice and video across digital networks. Just as there is a critical need for high-speed connections to information and broadband entertainment sources outside the home, there is a growing need to rapidly move this digital data between devices within the home. The Home Phone Line Networking association specifications provide simple, high-speed and cost-effective home networks using a consumer's existing phone line.

Present day architectures capable of supporting home telephone line based network systems include HomePNA version 1; a 1 Mbit/s technology which essentially implements an Ethernetover-telephone line technology and HomePNA version 2, a next generation 10 Mbit/s networking technology.

In order to ensure compatibility with other communication services within the home, such as voice, ISDN, and xDSL data services, the HomePNA 1 Mbit/s technology occupies the passband frequency range between about 3 MHz and about 12 MHz and utilizes passband filters which attenuate frequencies below 3 MHz very rapidly, such that there is no interference with other DSL services or traditional telephone service. Additionally, the HomePNA 10 Mbit/s technology occupies passband frequency range of from about 12 MHz to about 30 MHz. Although operating at a separate frequency band, HomePNA version 2 (10 Mbit/s) devices must share a communication medium (an unshielded twisted wire pair) with any HomePNA version 1 devices that currently exist in the home. In order for the network to function properly, version 1 and version 2 devices must contend for access to the physical wiring medium and, when a version 1 device successfully gains access, the throughput of the network is limited to the data rate attendant upon a generally lower capability version 1 device.

Pertinent to this discussion is the realization that the achievable capacity over most existing premises phone wiring is able to extend upwards to approximately 100 Mbit/s using selective portions of an extended frequency band. The pressure of new applications, combined with ever advancing silicon integration, has resulted in a rapid increase in electronic device performance and the functionality offered thereby. In order to keep up with the evolution of new technological applications, such as higher speed access services, multi-user gains, digital video networking, and the like, home networks must utilize as much of the achievable network capacity as possible, while retaining backward compatibility with devices constructed to conform to earlier standards or specifications.

Accordingly, some means must be provided to enhance the throughput of HomePNA network systems in order to recover the largest degree of available bandwidth attendant to home telephone wiring installations.

SUMMARY OF THE INVENTION

A system for establishing a plurality of logical networks over a common unshielded twisted pair communication medium includes at least first and second pairs of bidirectional communication nodes. Each node of both the first and second pairs include a first physical layer device configured to operate in accordance with a first communication protocol and a second physical layer device configured to operate in accordance with a second communication protocol. A first frequency band is associated with the first communication protocol and a second frequency band is associated with the second communication protocol. The first pair of bidirectional communication nodes communicates with one another through their respective first physical layer devices over the first frequency band. A second pair of bidirectional communication nodes simultaneously communicates with one another through their respective second physical layer devices over the second frequency band.

In a particular aspect of the invention, medium access layer means establish communication over the unshielded twisted pair communication medium in accordance with both the first and second communication protocols. Each network node is capable of bidirectionally communicating over the unshielded twisted pair communication medium using either the first or the second communication protocols independently. The first communication protocol is characterized by a first particular data rate and the second communication protocol is characterized by a second particular data rate greater than the first.

In an additional aspect of the invention, the logical network system includes a third frequency band, whereby a pair of bidirectional communication nodes are capable of establishing communication over the unshielded twisted pair communication medium through their respective second physical layer devices over the third frequency band. In one aspect, the third frequency band overlaps the first and second frequency bands. In an alternative aspect, the third frequency band is contained within the first frequency band. A pair of bidirectional communication nodes establish communication over the unshielded twisted pair communication medium through their respective second physical layer devices over the third frequency band in accordance with the first communication protocol.

In a bidirectional communication device of the type adapted to communicate information over an unshielded twisted pair communication medium, a network node system includes a first physical layer device configured to transmit and receive information modulated in accordance with the first communication standard. A second physical layer device is configured to transmit and receive information modulated in accordance with a second communication standard. A medium access layer establishes communication over the unshielded twisted pair communication medium in accordance with first and second communication protocols, with the network node being capable of bidirectionally communicating over the unshielded twisted pair communication medium using either the first or second communication protocols independently.

In one particular aspect of the invention, the medium access layer includes first and second medium access layer devices configured to support communication in accordance with the first and second communication protocols, respectively. In a further aspect of the invention, the medium access layer includes a single medium access layer device constructed to support communication in accordance with both the first and second communication protocols. The first and second physical layer devices are coupled to the medium access layer device through a select circuit.

In yet a further aspect of the invention, a system for passing transmitter parametric data to a receiver, in a bidirectional communication system of the type adapted to communicate packet information over an unshielded twisted pair communication medium includes an information packet, provided by a transmitter, the packet including a data portion and a training sequence portion prepended to the data portion. The training sequence is provided in either a first, extended form, or a second, truncated form, to a receiver. A header, prepended to the information packet, includes a transmitter parameter field which includes an index that identifies the form of the training sequence. The training sequence is provided in the second truncated form to the receiver only if the training sequence has been previously provided to the receiver by the transmitter in the first extended form.

A method for passing transmitter parametric data to a receiver includes the steps of transmitting an information packet from a first transmitter device to a first receiver device, the packet including a data portion and a training sequence portion prepended to the data portion. The training sequence is provided in either a first extended form, or a second truncated form to the first receiver. A transmitter parameter header is prepended to the information packet, the header including a transmitter parameter field having an index which identifies the form of the training sequence. The transmitter parameter header is read by a first receiver. The first receiver downloads at least a set of compensation filter coefficients from the receiver's internal memory, if the transmitter parameter header indicates the training sequence as provided in the second, truncated form. The receiver performs at least a compensation filter training operation in accordance with the training sequence, if the transmitter parameter header indicates the training sequence is provided in the first, extended form.

An efficient protocol grants access and allocating bandwidth resources to multiple nodes of differing capabilities on a local area network. Network resources are divided into fixed time-length slots and network nodes are granted access to particular numbers of time slots according to their bandwidth and service quality requirements. Access and resource allocation is made by a particular network node configured or identified as a network manager, which develops a bandwidth allocation map and provides the map to all of the other nodes coupled to the network on a broadcast basis. Network nodes subsequently communicate with one another during their allocated time periods. The ability to guarantee scheduling of network resources results in increased network efficiency and performance, raising network performance to levels compatible with Quality-of-Service (QoS) requirements of high quality multimedia services.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

Figure 1:
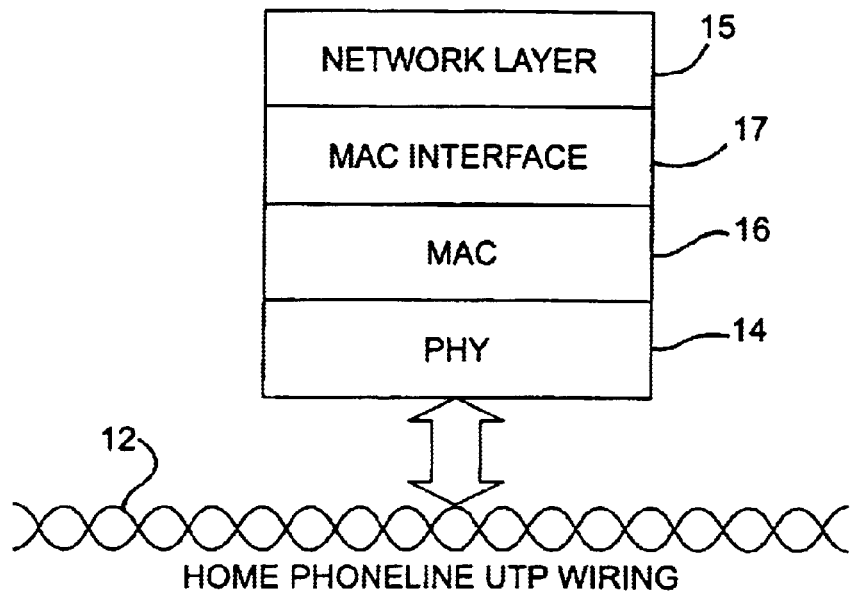
FIG. 1 is a semi-schematic simplified block diagram of a convention home phone line network node architecture in accordance with the prior art.

Briefly, the present invention is directed to a system and method for accommodating home phone line network devices which are compliant with the presently developed HomePNA transmission protocols and standards, exemplified by the HomePNA Specification 1.0 and HomePNA Specification 2.0, to be interoperable in a network using existing home phone line wiring and to be further interoperable with devices compliant with the proposed HomePNA Specification 3.0 and/or other broadband transmission standards and protocol such as 10BASE-T Ethernet, and the like.

As is well understood by those having skill in the art, the achievable capacity over most existing in-premises unshielded twisted pair phone wiring is able to be extended upwards to about 100 Mbit/sec, using selective portions of a frequency band extending from about 2 to about 30 MHz, by employing the spectrally efficient modulation technique that encodes up to 8 bits of data per symbol during transmission. Such in-premises phone line-based networks are dynamically rate adaptive, capable of adjusting to the changing electrical characteristics of an unshielded twisted pair phone line communication channel. This highly flexible adaptively makes high data rates robust, even given the impairments associated with unshielded twisted pair wiring, as well as being scalable to present and future needs of real time multimedia applications in the home.

The original HomePNA Specification 1.0 (HPNA 1.0 or alternatively, HPNv1 or HPNAv1) is a 1 Mbit/sec technology, implemented using relatively straight forward IEEE 802.3 CSMA/CD (carrier sense multiple access/collision detect) methods for multiple access to a common communication medium. HPNA 1.0 utilizes a frequency band residing in the passband region above other communication services hosted by in-premises unshielded twisted pair (UTP) wiring such as plain old telephone service (POTS), ISDN, and xDSL data services. Typically HPNA 1.0 occupies the passband frequency range between about 3 MHz and about 12 MHz such that there is no interference with other DSL services or traditional telephone communication channels.

HPN 2.0, on the other hand, is a 10 Mbit/sec networking technology which provides for higher speed access services such as multi-user games, PC hosted TV games, digital video networking, multi-Mbit data services over satellite, DTV broadcast, and the like. HPNA 2.0 networking technology typically occupies a passband frequency region residing above the frequency band identified to HPNA 1.0, and typically occupies frequencies in the range of from about 12 MHz to about 30 MHz.

Needless to say, with a potential 100 Mbit/sec achievable capacity over most existing in-premises telephone wiring installations, additional passband frequency ranges, residing above the frequency bands allocated to HPNA 1.0 and HPNA 2.0 may be allocated to follow-on high-speed high-density HPNA technologies. Products equipped with next generation HPNA technology might include PC's, ADSL modems, cable modems, home gateways, digital TV's and set top boxes, digital IP phones, digital IP radios, and other network appliances.

However, given the multiplicity of devices that are capable of being connected to a home phone line network, and their vastly differing bandwidth and data rate requirements, it is possible that devices compliant with HPN 1.0, HPN 2.0, and indeed other nodes based on different technologies in order to address different applications might all be coupled to the same inpremises telephone lines. In particular, a home phone line network could be made up of only HPN 1.0 devices or alternatively, only HPN 2.0 devices, or a mixture of the two. It should be noted that in addition to its capability of communicating with nodes of the same type, an HPN 2.0 node is also capable of communicating with HPN 1.0 nodes, on the same network, in order to provide a degree of backward compatibility and interoperability. Due in great part to the backward compatibility requirement, mixing nodes on a single home phone line network leads to a significant loss in transmission bandwidth as will be described in greater detail below.

Pertinent to the following descriptions of exemplary embodiments of the invention is the realization that the systems and concepts disclosed are not necessarily limited to HPNA 1.0 and HPNA 2.0 architectures. Indeed, with the constant demands for ever higher bandwidth allocation for modern communication devices, the evolution of communication protocols is to be expected. Thus, although discussed in terms of existing architectures, such as HPNA 1.0 and 2.0, the invention will be appreciated as being applicable to higher-order architectures as they become available.

In this regard, and for purposes of explanation, a lower speed and lower capability architecture, such as HPNA 1.0, will be referred to as an HPNvX architecture, while a higher speed, higher capability architecture will be referred to as an HPNvY architecture. An even higher order architecture will be referred to generically as an HPNvZ architecture.

Turning now to FIG. 1, there is depicted in simplified, semi-schematic form, a conventional HPNvX node 10, coupled to an unshielded twisted pair (UTP) home phone line transmission medium 12. The network node 10 conventionally includes a physical layer device (PHYvX) 14 connected, at one end, to the phone line transmission medium 12 such as unshielded twisted pair wiring, and connected at the other end to a medium access control (MACvX) sub-layer 16.

As is commonly understood, a physical layer device implements the transmit and receive functions of any particular node and includes the circuitry required to modulate, demodulate, encode, decode and equalize the signals transmitted over the physical communication medium 12. The MACvX sub-layer 16, also termed layer 2 or the data link layer, defines the sub-layer in which the network communication protocols are defined. The MACvX 16 is, in turn, coupled to high layer protocol stacks 15 such as a packet layer, network signaling layer or other layer services which might include guaranteed delivery of data across a network, segmentation of large messages into packets small enough to be handled by lower layer protocols, and the like. An interface layer 17 is typically provided in order to facilitate communication between the MACvX 16 and the higher order network layer 15, for example.

In the conventional architecture of FIG. 1, both the PHYvX 14 and MACvX 16 might be configured to operate in accordance with a particular home phone line network transmission methodology. In the case of a node configured to operate in accordance with HPNA 1.0, both the MAC and PHY are configured to operate in accordance with particular data and/or symbol rates, 1 MHz symbol rates at maximum bit rates of about 2 Mbits/sec, for example, and support a MAC protocol in accordance with IEEE 802.3 CSMA/CD.

In the case of a node configured to be compliant with HPNA 2.0, the node is required to be interoperable with HPN 1.0 nodes coexisting on the same home phone line network. In order to accommodate interoperability, an HPN 2.0 node includes a PHY 1.0 device in order to communicate with existing HPN 1.0 nodes and a more advanced PHY 2.0 device which enables the higher data rates and network performance exemplified by the HomePNA Specification 2.0.

Thus, a PHYvY, characterized in HPN 2.0 technology, implements a quadrature amplitude modulation (QAM) methodology which allows bandwidth efficient transmission and economical implementation. The PHY 2.0 device's symbol rate is digitally programmable, up to a symbol rate of about 10 MHz, in order to utilize the available frequency bandwidth. The number of bits per QAM symbol is further programmable from 1 bit per symbol to more than 8 bits per symbol, at maximum bit rates of about 20 Mbits/sec. A PHYVY device further includes forward error correction (FEC) functions that are able to be selected in order to provide various levels of coding gain, as well as having its center frequency digitally programmable through its operating frequency band of from about 12 to about 30 MHz. Accordingly, it can be seen that a higher order HPN node is able to communicate with other HPN nodes through either a low speed PHYvX or an attendant high speed PHYvY device.

However, conventional, higher capability HPNvY nodes are designed to share or overlap bandwidth with preexisting lower capability HPNvX nodes, leading to significant bandwidth limitations and network data throughput. In particular, no more than one traffic layer is allowed over the phone line network at any given time either through a node's PHYvX or PHYvY device. The PHYvX and PHYvY devices with overlapped frequency bands would be required to contend for media access before transmission is allowed and would further be required to adopt the same media access scheme, regardless of their inherent capability. As a result, the effective network throughput would be reduced to the average of the throughputs of the two PHY devices, depending on the percentage of time that each PHY device would occupy the transmission media. Further, because of the requirement to adopt the same media access scheme, the latency, jitter, and level of quality of service (QoS) of the PHYvY devices would necessarily be limited to those inherent in an HPNvX architecture. These limitations significantly hamper an HPNvY node in addressing applications that require higher network performance than that achievable in an HPNvX design.

While an HPNvY node typically implements two PHY devices, the node is commonly implemented with only a single MAC sublayer. In accordance with practice of principles of the invention, an HPNvY node (or HPNVZ nodes configured in accordance with higher speed and higher density standards such as HPN 3.0, and the like) are configured with either multiple, independently designed MAC sublayers, with each MAC adapted to a particular mode of operation, or a purpose designed MAC sublayer which is able to adaptively accommodate both high speed channel and low speed channel modalities.

Figure 2:
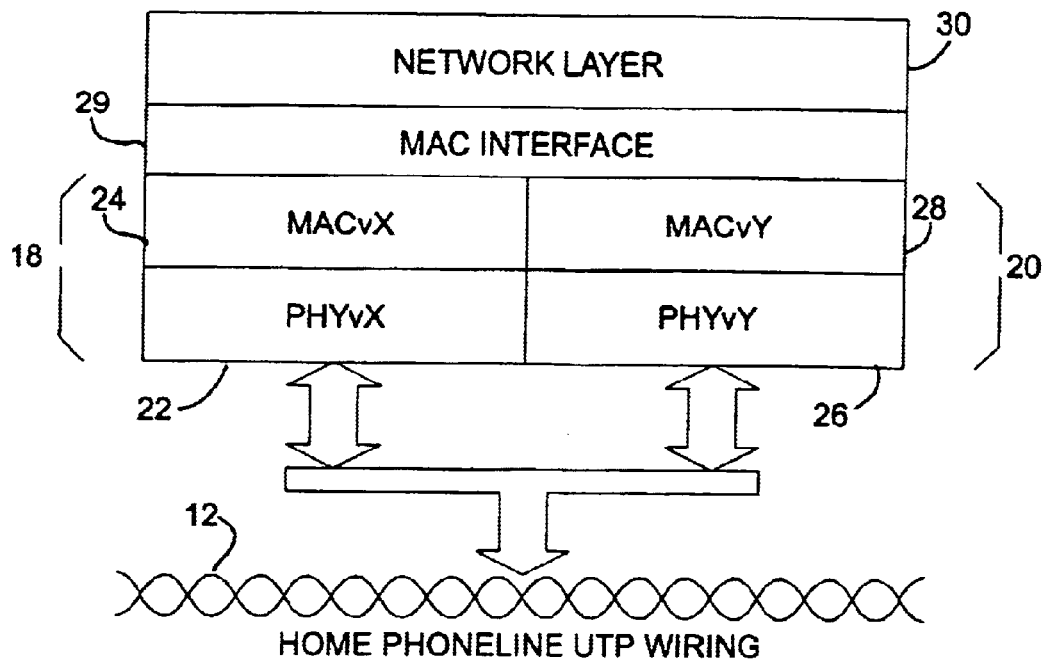
FIG. 2 is a semi-schematic simplified block diagram of a home phone line network architecture, in accordance with the present invention, including two physical layer devices and two MAC sublayers.

FIG. 2 is a semi-schematic simplified block diagram of a home phone line network architecture incorporating a dual, independent MAC approach for an HPNvY node. The architecture of FIG. 2 is suitably implemented to include an HPNvX node 18 coupled to a UTP transmission medium 12 as well as an HPNvY node 20 also coupled to the UTP transmission medium. The HPNvX node includes a PHYvX device 22 coupled between the transmission medium and a MACvX sublayer 24. The HPNvY node 20 further incorporates a second pair of PHY and MAC devices, a PHYvY 26 device coupled between the transmission medium and a MACvY sub-layer 28. The PHYvY device 26 normally operates with the MACvY sub-layer 28 when the PHYVY device is operating in a frequency band fully distinct from the PHYVX device 22, as will be described in greater detail below. The PHYvY device is also able to operate with the MACvX sub-layer 24 when the PHYvY device uses a frequency band fully or partially overlapping the PHYvY's nominal frequency band. This particular architecture is useful for applications such as bridging a home phone line network to a broadband gateway device, such as a cable modem chip or to another network.

In a single MAC architecture, exemplified by the present state of the art, a higher speed PHYvY must compete with the lower speed PHYvX in accessing the bridge, because the bridge is only able to be accessed through the single MAC and the MAC must be shared between both PHY devices. The net throughput accessing the bridge will necessarily be the average of the throughputs of the PHYvX and the PHYvY devices when they access the bridge.

In a dual MAC architecture, in accordance with the invention, the higher speed PHYvY 26 is able to independently access a bridge (illustrated in simplified form as a network layer 30) through its own MACvY 28 and a MAC interface layer 29. It can be seen that the dual MAC architecture, in accordance with the invention, is also able to be used to implement a network node that services multiple applications and which necessarily requires separate MAC sub-layers to address each application's specific protocol requirements.

Figure 3:
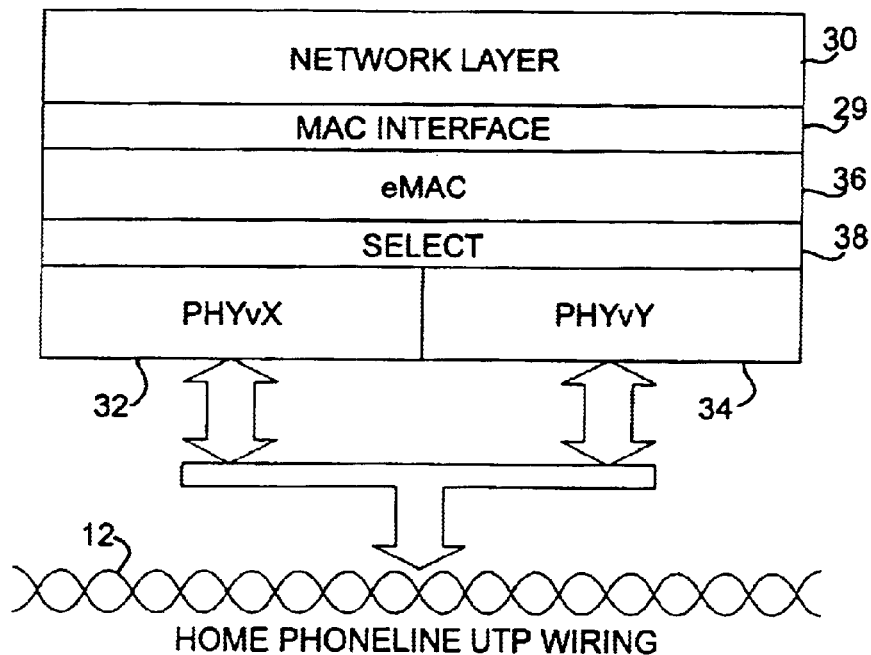
FIG. 3 is a semi-schematic simplified block diagram, in accordance with the present invention, the home phone line network node architecture including two physical layer devices coupled to a single transmission channel and including a single MAC sublayer.

An alternative implementation of a multi-capable node, in accordance with the invention, is depicted in simplified, semi-schematic form in FIG. 3. In the exemplary embodiment of FIG. 3, a multi-capable node architecture is suitably implemented with two PHY devices, a PHYvX device 32, operable in accordance with a first, generally lower speed network communication channel, and a PHYvY device 34 operable in accordance with a second, generally higher speed channel. Both PHY devices are coupled to a single MAC 36 through a select switch 38, which allows sharing of the MAC 36 between the two PHY devices.

Although exemplified as a single MAC architecture, the MAC 36 in accordance with the exemplary embodiment of FIG. 3, incorporates the features and interfaces required to address specific network performance requirements when operating in conjunction with the higher speed higher density PHYvY device 34, while including the lower speed functionality of a conventional MACvX as a truncated subset. Hence, the MAC 36 might properly be termed an enhanced MAC, or, as referred to herein, an eMAC. In particular, the shared eMAC 36 is able to develop error rate reports to a transmitting node and address the various quality of service (QoS) metrics associated with HPNvY and higher-order standards. Such QoS metrics extend to bandwidth support and latency guarantees, as well as to packet classification.

Certain QoS categories supported by the eMAC 36, as well as a MACvY, might include "guaranteed service", which guarantees data rate and an upper bound on the maximum delay of a transmitted packet; "predictive service", which supports services able to vary their internal delay characteristics in response to varying packet delays, i.e., able to tolerate a certain number of late arriving packets and able to operate with a reasonably reliable, but not necessarily fixed, delay bound; "controlled load", which provides a client data flow with a QoS most closely approximating the QoS which that same flow would experience from an unloaded network element; and "best effort", which provides normal network resource access and performance, without providing for data rate or latency guarantees. All of these QoS categories, as well as various others not discussed herein, are well understood by those having skill in the art, and do not require any further elaboration. It is sufficient that an eMAC, in a single MAC architecture, or a MACvY, in a dual MAC architecture, have the capability of addressing QoS support as it is defined in an HPNA standard.

Returning now to FIG. 3, the two PHY devices are connected to the shared eMAC through a selector 38 which arbitrates access of the two PHY devices to the shared eMAC. The shared eMAC 36 is able to operate in a full duplex mode that facilitates transmitting information to a first PHY device, i.e., PHYvX 32, while at the same time receiving information from the second PHY device, i.e., PHYvY 34. Full duplex operation allows eMAC access rates of the two PHY devices to be symmetric as well as asymmetric. For example, while the PHYvX device 32 is passing data received from the network to the shared eMAC at a first data rate, the PHYvY device 34 is able to transmit packets (or frames) of information received from the eMAC 36 to the network at a second, different data rate.

Because the symbol rate, the number of bits per symbol, and the center frequency of a PHYvY device are all digitally programmable, this allows the PHYvY device of an HPNvY node to be capable of operating at various center frequencies, with various frequency bandwidths and at various bit rates. However, the PHYvY device in an HPNvY node commonly attempts to use frequency bands above those of the PHYvX device. In an exemplary case, a PHYv2 might use frequency bands above those specified for use by a PHYv1 (by the HomePNA Specification 1.0, for example).

Figure 4:
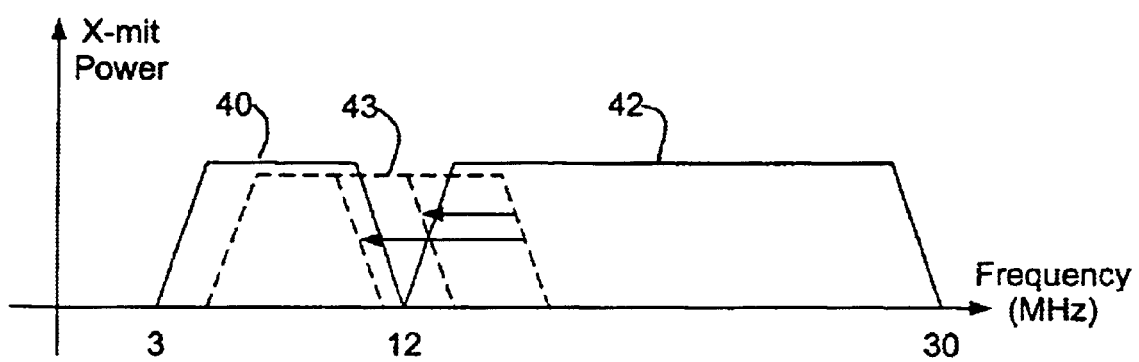
FIG. 4 is a simplified frequency band diagram depicting dual frequency bands for a home phone line network in accordance with the present invention.

Specifically, a PHYvY device attempts to use a frequency band higher than and separate from the frequency band used by the PHYvX device as illustrated in the frequency band diagram of FIG. 4. In the exemplary embodiment of FIG. 4, a first frequency band 40 is typically associated with HPNA 1.0 transmissions and resides in the frequency range of from about 3 MHz to about 12 MHz. A second frequency band 42 is commonly associated with HPNA 2.0 transmissions and resides in the frequency range of from about 12 MHz to about 30 MHz. It should be axiomatic that additional frequency bands can be identified to higher speed HPNA implementations and would necessarily reside in a frequency range beginning at about 30 MHz and extending to approximately 100 MHz. Utilizing separate frequency bands 40 and 42 for the two network types allows traffic over the two frequency bands to coexist simultaneously, since the two frequency bands are separated from one another.

Accordingly, two HPNvX nodes utilizing PHYvX devices may bidirectionally communicate with one another using the first frequency band 40 while two HPNvY nodes, utilizing PHYvY devices, are able to simultaneously bidirectionally communicate over the same physical wiring plant using the second frequency band 42. In accordance with practice of the present invention, it should be noted that the two nodes which use the first frequency band 40 to bidirectionally communicate with one another could be implemented as either HPNvX nodes, HPNvY nodes, or a mix. This particular feature of the invention is obtained when it is realized that an HPNvY node is implemented with both PHYvX and PHYvY physical layer devices. This dual band approach and dual band operation applies to scenarios in which both HPNvX and HPNvY nodes exist on the same network, as well as applying to a scenario in which only HPNvY nodes exist.

The particular dual band approach described above, results in a network architecture that can be considered as two logical networks superposed on one another on the same physical wiring network, where each logical network operates in its own particular frequency band. A lower capability (lower speed channel) HPNvX node would be configured to operate over a single logical network, exemplified by the first frequency band 40 of FIG. 4, whereas, in contrast, an HPNvY node is configured to operate over both logical networks by virtue of its incorporate of PHYvX and PHYvY devices. Thus, an HPNvY node typically uses the first frequency band 40, through its PHYvX device, in order to communicate with other HPNvX nodes. An HPNvY node is able to use either the first frequency band 40 or the second frequency band 42 in order to communicate with another HPNvY node and typically uses the first frequency band 40 to communicate with other HPNvX nodes.

Selection between the two frequency bands 40 and 42, where the particular node is in an HPNvY configuration, is made by higher network layer functions, such as a link layer control sublayer, network protocol layer or transport layer. The decision on which frequency band is to be used can be decided based on the traffic loading condition of each network and/or the attributes of supported applications, including the bit rate requirement, latency/jitter requirements, level of priority, and the like. For example, an HPNvY node attached to a gateway device, such as a cable modem, would be able to direct an incoming low bit rate facsimile transmission through the lower speed transmission channel exemplified by first frequency band 40, using its PHYvX device, and would further be able to direct a speed/latency sensitive video stream through the higher speed transmission channel exemplified by the second frequency band 42, using its PHYvY device.

In contrast to prior art architectures, the total available network throughput of the dual logical superposed networks of the present invention, is the sum of the throughputs of each of the two logical networks. Further, network performance parameters such as the packet latency and latency jitter variance of each. logical network are independent of one another, because of the independent design of the MAC sublayers. Thus, the logical network using the second frequency band 42 is able to be designed in a manner independent of the design of the logical network using the first frequency band 40, in order to address the higher speed network's differing performance requirements, such as throughput, latency, latency jitter, and quality of service (QoS).

Significantly, the use of dual frequency bands is not limited to supporting HPNvX and HPNvY nodes on the same physical network, in order to implement the dual logical network functionality of the invention. Multiple HPNvY nodes are able to establish the dual logical network functionality between and among themselves because each HPNvY node incorporates a PHYvY device which has the capability and flexibility of operating in a frequency band below and separated from the second frequency band 42 of FIG. 4. This alternative frequency band 43 resides within, includes or overlaps (but is not necessarily limited to) the first frequency band 40 typically associated with HPNvX devices. When multiple HPNvY node communication is desired, an HPNvY node surrenders the use of its PHYvX device which is configured to operate only in the first frequency band 40.

When a PHYvY device is operating in the alternative frequency band 43, it adopts the media access scheme (protocol) and the MAC functionality originally designated for use by the PHYvX. When operated in accordance with this particular scheme, the PHYvY must contend with other node's PHYvY devices that are able to access the physical media using the alternative frequency band, as well as other PHYvX's that are able to access the physical media using the corresponding first frequency band 40. Accordingly, while two HPNvY nodes are able to bidirectionally communicate through their PHYvY devices over the second frequency band 42, two other HPNvY nodes are able to bidirectionally communicate with each other through their PHYvY devices over the alternative frequency band.

In other words, the logical dual network allows a pair of HPNvY nodes to simultaneously communicate with an HPNvX node and an HPNvY node using the first and second frequency bands 40 and 42, or allows a pair of HPNvY nodes to simultaneously communicate with another pair of HPNvY nodes using the second and the alternative frequency bands 42 and 43.

The choice of operating a PHYvY device in the alternative frequency band, versus operating the PHYvX device in the first frequency band in HPNvY nodes, is configurable and can be decided either on a per node basis or on a global basis involving the entire network. Configuration can be done by either providing a jumper on the NIC card, for example, or by providing a configuration word into a configuration register in a memory area of the node circuitry.

By way of example, in the event that there are no HPNvX nodes existing on the network, all of the HPNvY nodes may jointly elect to operate their PHYvX devices in the alternative frequency band 43 in addition to the nominal HPNvY frequency band 42. The total network throughput in this case is once again the sum of the throughputs of each of the two logical overlaid networks. Further, logical networks utilizing the alternative frequency band 43 exhibit a higher throughput than the case in which PHYvX devices operate in their nominal first frequency band 40, since a PHYvY device necessarily implements a significantly higher bandwidth efficient modulation scheme than a PHYvX device and accordingly is able to support a significantly higher data rate.

Similarly, in the event that a physical link between two nodes exhibits sufficiently high channel impairments to preclude operation over the higher frequency band 42, the two nodes may elect to operate their PHYvY devices in the alternative frequency band 43. Since the higher frequency band 42, in general, encounters a greater degree of channel insertion loss and crosstalk noise than the lower frequency band 40, the flexibility of allowing communication between two PHYvY devices through the alternative frequency band provides a higher percentage of successful connections between any two PHY 2.0 devices.

Figure 5A:
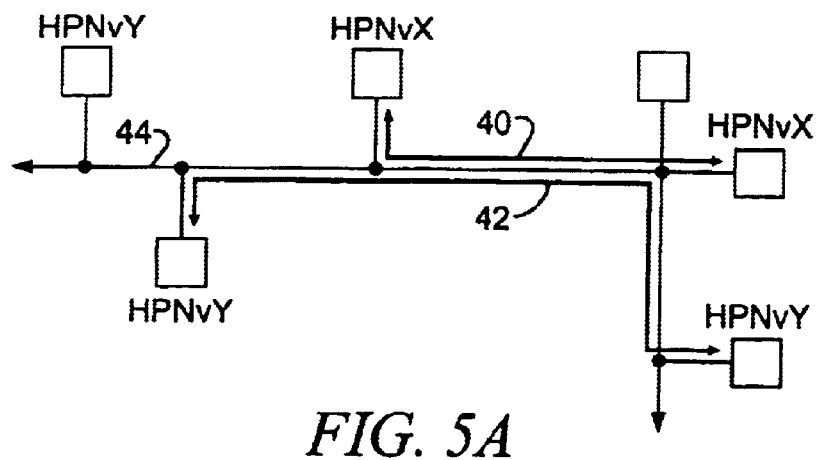
FIG. 5a is a simplified, semi-schematic diagram of a home phone line dual logical network installation illustrating simultaneous transmission between a first set of devices with dissimilar transmission protocols on a single home phone line network.
Figure 5B:
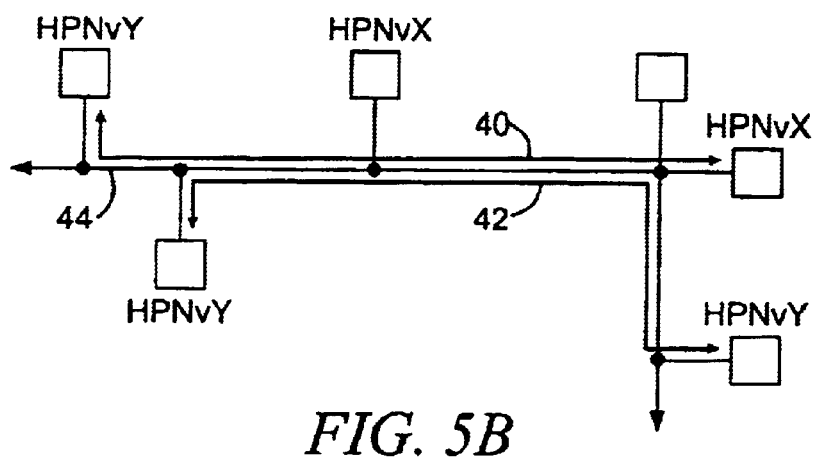
FIG. 5b is a simplified, semi-schematic diagram of a home phone line dual logical network installation illustrating simultaneous transmission between a second set of devices with dissimilar transmission protocols on a single home phone line network.
Figure 5C:
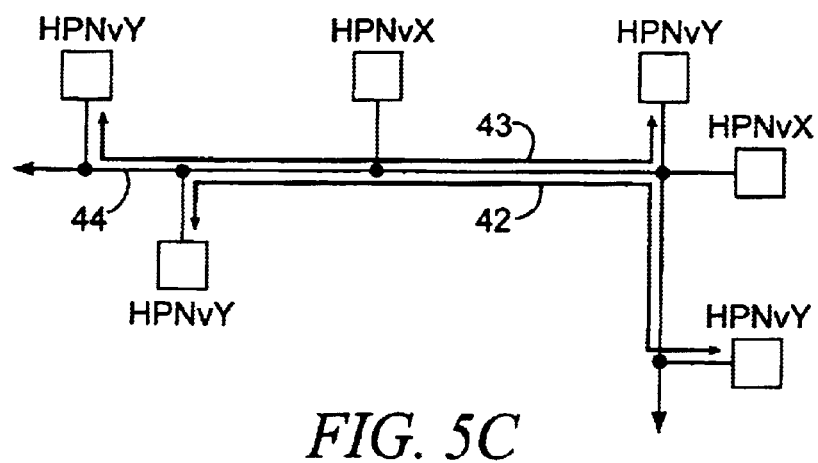
FIG. 5c is a simplified, semi-schematic diagram of a home phone line dual logical network installation illustrating simultaneous transmission between a third set of devices with dissimilar transmission protocols on a single home phone line network.

Particular examples of the dual logical network architecture according to the invention are illustrated in simplified, semischematic form in FIGS. 5a, 5b and 5c. In the particular exemplary embodiment of FIG. 5a, simultaneous dual band transmission on a single home phone line network is made between a pair of HPNvX devices, coupled to a home phone line physical network 44 utilizing the first frequency band 40. Simultaneously, two HPNvY devices, coupled to the same physical network 44 bidirectionally communicate with one another utilizing the second frequency band 42, separate from the first frequency band 40. Similarly, in FIG. 5b, simultaneous dual band transmission is supported between an HPNvX device and an HPNvY device coupled to the physical network 44 over the first frequency band 40, while, simultaneously, a pair of HPNvY devices, coupled to the same physical network 44 bidirectionally communicate with one another over the second frequency band 42. In FIG. 5c, two pairs of HPNvY devices, or nodes, are able to bidirectionally communicate with one another with one of the pairs utilizing the second frequency band 42 in conventional fashion, while a second pair utilizes the alternative frequency band 43 which might include or reside within the first frequency band or might be implemented as a frequency band which overlaps the first and second frequency bands to some degree.

Thus, no matter how implemented, multiple nodes in a home phone line network architecture are able to establish dual logical overlaid networks that support relatively low speed data transmission between devices that do not require high bandwidth utilization, while at the same time supporting high speed transmission between devices that require a substantially higher degree of bandwidth utilization without impacting total network throughput to any significant degree. The nodes in such a dual logical network architecture are advantageously configured with physical layer devices that address each logical network. In cases where the network is designed to support HPNvX and HPNvY nodes, the higher capability HPNvY nodes incorporate both PHYvX and PHYvY devices, allowing for a dual mode network architecture. In cases where the network is designed to incorporate not only HPNvX nodes but also HPNvY and HPNvZ nodes, the higher order devices will necessarily incorporate corresponding physical layer devices which would allow like-to-like bidirectional transmission as well as like-to-unlike bidirectional transmission in order to provide backward compatibility. In these instances, the network configuration might include further defined frequency bands beyond those exemplified in FIG. 4 and might, indeed, be implemented as three, or more, superposed logical networks, each operating in its own corresponding frequency band region. Because the symbol rate, the bits per symbol, and the center frequency of PHYvY and above devices are digitally programmable, it is evident that HPNvZ nodes are also able to communicate with one another utilizing alternative frequency bands incorporating those frequency regions more commonly allocated to lower level devices such as HPNvX and HPNvY nodes.

In operation, even in a dual logical network configuration as described above, a "best available data rate" or a "best available error rate" approach is used for data transmission between any pair of PHYvY devices whether over their nominal second frequency band (42 of FIG. 4) or the alternative frequency band (43 of FIG. 4) because of the large variation in characteristics of individual home phone line wires. When a pair of HPNvY nodes attempt to communicate, the communication initiates using the highest possible data rate and extending over the entire available bandwidth. A receiving node monitors the received signal's signal-to-signal noise ratio (SNR), the received signal's error rate, or an equivalent metric at different network layers. Equivalent metrics might include, but are not necessarily limited to, the measured SNR of received QAM symbols, or a packet (or frame) error rate as defined at the various network layers. Once the various quality metric is established, the receiving node may elect to transmit a maintenance packet to the corresponding transmitter of the transmit node, which includes a reception quality metric, such as SNR, error rate, and the like.

An alternative protocol might be implemented when it is desirable to reduce the amount of initialization hand shaking, by having a transmit node estimate the link condition associated with a particular receiving node, by monitoring the associated re-transmission rate issued by its higher layer protocols. Necessarily, a higher re-transmission rate implies a degradation in the quality of a signal received by the associated receiver. Depending on the transmission quality metric, a transmit node is able to implement a protocol which adaptively adjusts its transmission parameters in order to accommodate a specific receiving node. Such adaptively adjustable transmission parameters include a transmission's symbol rate, the number of bits-per-symbol, center frequency, forward error correction (FEC) coding and transmit power spectrum density (PSD), as is well understood by those having in the art. Once a transmitter's parameters are adaptively adjusted and a receiver's reception quality metric evaluated, a set of transmitter parameters are selected which define a "best data rate" given a desired error rate performance between the two nodes. Conversely, if a minimum data rate is requested from the transmitting node and the desired error rate cannot be maintained by the transmitter at the specified minimum data rate, the transmitting node is able to elect to transmit at the minimum required data rate and adaptively adjust its transmission parameters in order to achieve a "best available" error rate, even though less than the desired error rate performance.

Because of the non-uniform condition of a home phone line wiring plant, the values of a transmitting node's transmitter parameters consequently vary on a receiver-to-receiver basis and are necessarily determined for each individual receiving node. Once communication between a transmit node and receive node is established, and the transmit parameters for that particular node pair are defined, those parameters are stored and maintained in a look-up table in the transmitting node where they are available for access in the case where that transmitting node is required to communicate, once again, with the particular receiving node at issue. Parameters so acquired are passed to the receiving node, in a manner to be described in greater detail below, in a transmit parameter header prepended to each data packet intended for that receiving node, in order to inform the intended receiving node as to how to configure the receiver circuitry of its corresponding PHY device.

In particular, information is communicated between HPNvY nodes using variable length Ethernet-type (ISO8802-3) packets in which a preamble containing a receiver equalizer training sequence is generally prepended to the packet data payload. The packet preamble training sequence allows an intended receiver (or receivers) to perform the necessary acquisition tasks before the receiver is able to successfully decode the information contained within the subsequent packet. The packet preamble training sequence typically includes timing information such that a receiver is able to acquire the correct baud timing as well as carrier timing and phase information and might further include a sequence of pre-determined symbols that would allow a receiver's equalizer to define an appropriate set of coefficients for its ISI compensation circuitry and demodulators, for example.

Since preamble training sequence header is part of the communication link's transmission overhead at the PHY layer, it is desirable to reduce the length of the preamble training sequence such that it is relatively short in comparison to the packet payload (variable in the range from about 18 to about 1518 bytes). However, in a home phone line network, various stubs connected to the transmission channel between two communicating nodes often cause severe inter-symbol interference (ISI) distortion. Other forms of channel induced ISI distortion are also particularly prevalent in the unshielded twisted pair wiring that makes up a home phone line transmission medium. While there are various, well-known methods of compensating for ISI distortion, they all require substantial amounts of equalizer training time at the receivers. In addition to a distortion compensation training sequence, receivers additionally need to acquire other operational parameters such as gain, symbol timing, carrier timing, and the like. When it is realized that different nodes may communicate with one another utilizing different PHY parameters such as symbol rate, bits-per-symbol, center frequency, FEC code, and transmit PSD, it becomes evident that some efficient means must be provided in order to map this parametric information from a transmit node to a corresponding receive node.

Accordingly, a frame header is incorporated into a PHY frame in order to the above requirements, i.e., a shortened preamble training sequence overhead for receiver acquisition and adjustable PHY parameters on a per-packet transmission basis.

Figure 6:
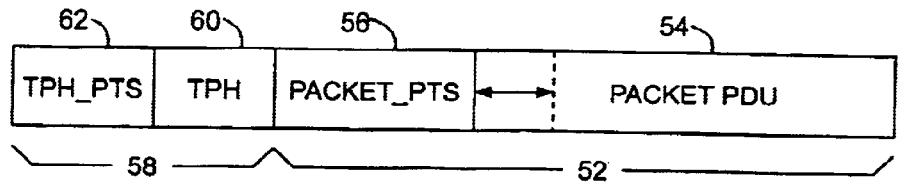
FIG. 6 is a simplified information packet structure including a transmitter parameter field in accordance with the invention.

Turning now to FIG. 6, there is shown a semi-schematic simplified PHY frame structure 50 that is useful for adaptive transmission between PHYvY devices of HPNvY nodes, in accordance with the invention. In the frame structure of FIG. 6, a PHYvY frame structure is suitably implemented in two portions, a first portion 52 which is generally implemented as a MAC frame, including a data packet 54 prepended with a packet preamble training sequence 56. The PHYvY frame structure 50 further includes a second portion 58 which might be termed a PHY frame, and suitably includes a transmitter parameter header 60 prepended with a transmitter parameter header preamble training sequence 62. In the exemplary embodiment to the invention, the PHY frame header 58 is transmitted in accordance with a small constellation-size modulation scheme, such as 4-QAM or binary phase shift keying (BPSK), since the smaller constellation-size modulation schemes require a considerably lower signal-to-noise ratio (SNR) at the receivers in order to support reliable transmission, as compared to the significantly higher constellation sizes associated with packet data transmission. Further, ISI distortion in a narrow-band channel is typically much less severe than in a wide-band channel environment thereby significantly decreasing the computational complexity of any required ISI compensation equalization. Accordingly, timing and training requirements are considerably less stringent than those associated with packet data, thereby allowing the transmitter parameter header preamble training sequence (TPH_PTS) to be very efficiently implemented with only a limited amount of information. The TPH_PTS essentially provides sufficient information for a receiver to sync (acquire) to the PHY frame header such that they are able to reliably decode the following transmitter parameter header (TPH) 60. The transmitter parameter header (TPH) 60 is also transmitted at the lower symbol rate (4-QAM or BPSK) as the TPH_PTS. Information contained in the TPH 60 includes the transmitting device's PHY identification (ID) number, the transmitting device's center frequency, the data symbol rate, the selected bits-per-symbol, the type of preamble training sequence for the MAC frame 52, the FEC coding type and the transmit PSD, for example. The TPH 60 enables an intended receiver to process the transmitter's ID and various transmitter parameters in order to configure the receiver's PHY parameters accordingly before the receiver begins receiving the subsequent MAC frame including the packet preamble training sequence 56 and the packet data 54.

Since only a limited amount of information needs to be carried within a TPH, the length of the TPH and TPH_PTS may be made significantly shorter than the packet size, thus significantly reducing frame overhead.

A further advantageous feature of the present invention involves its ability to adaptively modify the size and content of the packet preamble training sequence (PACKET PTS) 56 based on a historical record of successful communication modalities between a particular transmitter/receiver pair. In particular, the physical layer device (PHY) of HPNvY node receivers are able to adapt differing transmitting nodes using the PACKET_PTS field 56 prepended to the data packet 54. Such adaptation includes acquisition of gain control, carrier recovery, timing recovery and channel equalization utilizing QAM technology at the higher symbol utilized by data communication. A typical PHYvY receiver utilizes two acquisition modes; a first mode used for network initialization and re-configuration, and a second mode for normal bi-directional communication operation on an established network. In either case, a transmitter sends out its ID to the intended receiver, in the TPH field 60, prior to the receiver's receiving the PACKET_PTS field 56. In the initialization phase, each receiver trains on an extended PACKET_PTS, sent from the transmitting node, and once trained, stores the receiver parameters needed for future acquisition from the same transmitting node. Such receiver parameters include receiver gain, carrier frequency, timing frequency, and equalizer coefficients. The parameters are stored, locally, in a look-up table and are available for access and download by a receiver if a communication link is once again established with that particular transmitter. Subsequent transmissions over this link will employ a much shorter PACKET_PTS, since the receiver is able to download the required parameters based on the transmitting node ID included in the TPH 60 of each PHY frame. In this particular instance, the PACKET_PTS field 56 need only contain a short sync sequence in order to establish accurate baud and carrier timing. During receipt and processing of the PACKET_PTS information and the packet data, a receiver is able to track the downloaded parameters, on the basis of adaptive equalizer error terms and the like, and are able to elect to up-load the resultant parameter values at the end of transmission for association with that particular transmitter ID and future download. Each receiver necessarily has the capability of storing receive parameters for multiple sets of transmitters, with each set of receive parameters associated with a corresponding transmitter through the transmitter ID.

At the transmitter side, a transmitter notifies the intended receiver as to what form of PACKET_PTS (extended or short) will follow the TPH field 60 by providing a PACKET_PTS type code in the TPH. HPNvY transmitters have the flexibility to implement various protocols for deciding the PACKET_PTS type. One exemplary protocol would be to include an extended packet preamble training sequence for all cases in which an intended receiver is new to the transmitter, for packet re-transmissions to the same receivers, or after re-configuring the transmitter's PHY parameter set. A transmitter node need only keep track of the connection status with respect to each receiving node, in order for it to decide what type or form of PACKET_PTS to include in the frame.

As a result, only a short form of the PACKET_PTS would be required in the majority of transmissions, resulting in a significantly reduced network overhead.

Additionally, the two-tier PACKET_PTS system can be easily extended to a multiple-tier PACKET_PTS in which a plurality of intermediate training sequences are defined so as to correspond to various channel conditions. The shortest PACKET_PTS is used in the majority of transmissions, the fully extended (i.e., the longest) PACKET_PTS is used in the most harsh acquisition conditions, and selected ones of intermediate length PACKET_PTS's are used in intermediate situations, such as when a slightly higher data rate or a slightly improved error rate performance is desired. A transmitter has the flexibility to decide, through its MAC layer, what tier of PACKET_PTS is to be included for each packet and for each receiving node. Once the transmitter has decided, the type and form of the incorporated PACKET_PTS is included in the TPH of each frame.

Further, a PHYvY transmitter has a flexibility to select its transmission center frequency, its transmission symbol rate, the constellation size, FEC coding option, and transmit PSD, based on well-understood adaptation techniques. Each of these PHY parameters are included in the TPH 60 prepended to each data packet containing MAC frame. Thus, receiving nodes are able to promptly configure their PHYvY receiver on a packet-by-packet basis, thereby supporting efficient and robust communication with fewer packet re-transmissions required. It should be noted that the particular values of these PHY parameters are not necessarily the same for different intended receivers. These PHY parameter values are determined by each transmitter node on a per receiver basis, and multiple sets of the PHY parameters for intended receivers are stored in a look-up table, with each parameter set identified to a particular receiver (or node) ID.

In accordance with the discussion above, information contained in the TPH 60 of FIG. 6, is translated at much lower symbol rates than information contained in the data packet to allow fast acquisition. In addition, the TPH uses a small constellation size QAM such as 4-QAM or binary phase shift keying in order to further reduce the bandwidth demand. The total available frequency bandwidth can therefore accommodate multiples of the TPH frequency bandwidth, since each individual TPH transmission requires a relatively small bandwidth. However, a narrow-band transmission is more susceptible to deep notch channel distortion and to narrow-band interference. Unfortunately, such channel impairments are particularly valid in a home phone line networking environment.

Thus, and in accordance with the invention, multiple frequency bands are used to accommodate the TPH transmission, in order to provide a redundancy and frequency diversity, thus allowing more robust reception. A particular implementation of a PHYvY transmitter which implements frequency modulation using multiple carrier frequencies is shown in semi-schematic simplified block diagram form in FIG. 7A. In accordance with the invention, the exemplary embodiment of the transmitter of FIG. 7A uses a single modulator (similar to the case of a single carrier modulation) as opposed to using multiple modulators. In the case of single carrier modulation, a carrier frequency is developed in a direct digital frequency synthesizer (DDFS), for example, in which a look-up table typically stores the time-domain sample values of a sinusoidal wave form at the specific single carrier frequency, i.e., $\cos(2\pi f n T)$ and $\sin(2\pi f n T)$.

In the case of multiple modulation, as in the invention, a (DDFS) 66 includes a look-up table 67 which suitably contains the sum of the time-domain sample values of the sinusoidal wave forms at all desired carrier frequencies, i.e., $\cos(n)=\Sigma_k(2\pi f_k n T)$ and $\sin(n)=\Sigma_k \sin(2\pi f_k n T)$.

Figure 7A:
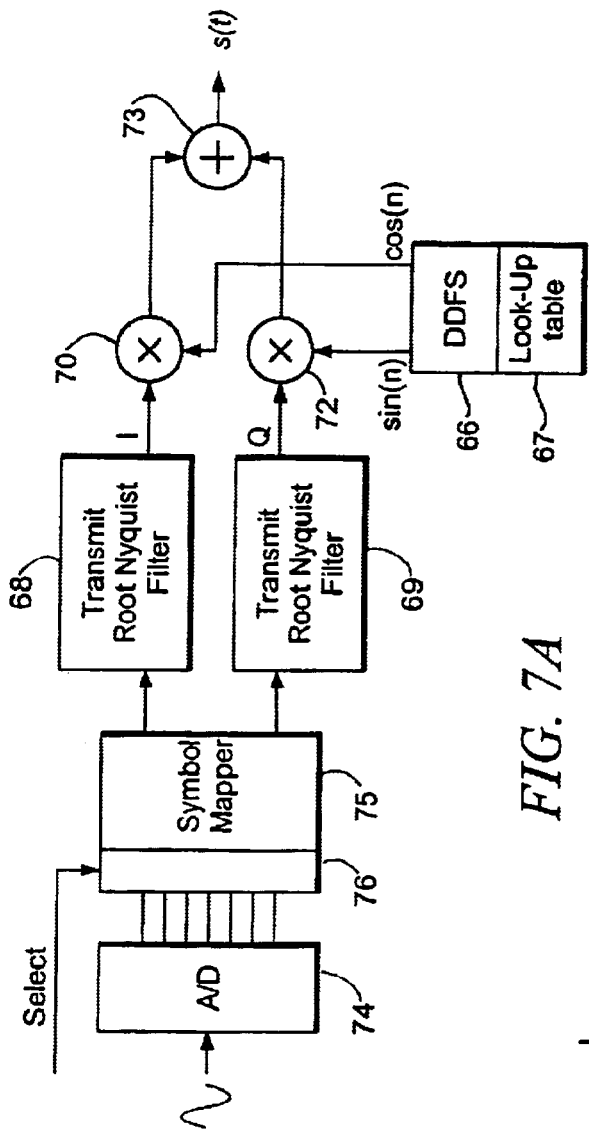
FIG. 7a is a simplified, semi-schematic block level diagram of a transmitter having a multi-frequency modulator in accordance with the present invention.

The look-up table entries are combined with complex output of a transmit root-Nyquist filter, depicted in the exemplary embodiment of FIG. 7A as a pair of real filters 69 and 69 operating on real (Q) and imaginary (I) portions of a complex signal. Carrier mixing is done in a complex mixer, depicted in the exemplary embodiment of FIG. 7A as a pair of real mixers 70 and 72. The resulting signal is combined in a logical adder 73 prior to being introduced to the transmission medium as a transmit signal s(t).

It should be understood that analog signals are initially digitized in an A/D converter 74 and the digitized signals are encoded into symbols in a symbol mapper 75. In order to accommodate the different symbol sizes contemplated by the TPH header portion and the data portion of a packet according to the invention, symbol encoding within the symbol mapper 75 is controlled by a select circuit 76 which selects mapping of digitized signals into either 4-QAM/QPSK constellations or 160-QAM, 32-QAM or higher constellations, depending on whether the digitized signals are intended as TPH header information or data.

Figure 7B:
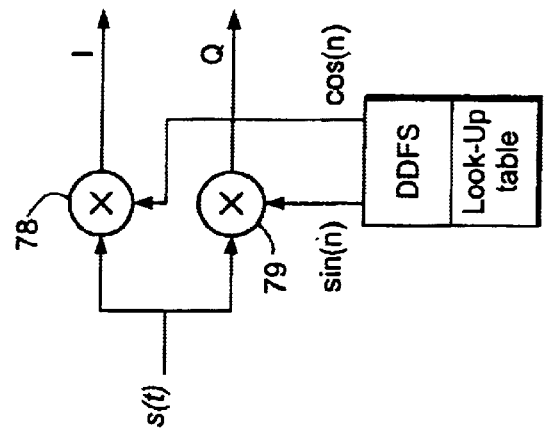
FIG. 7b is a simplified, semi-schematic block level diagram of a multi-frequency demodulator portion of a receiver.

An exemplary receiver demodulator architecture is depicted in simplified form in FIG. 7B. It can be seen that the demodulator architecture is a mirror image of the modulator architecture, in which s(t) is received and processed through a pair of mixers 78 and 79 in which the receive signal is mixed with opposite phase signals output by a DDFS in order to resolve the real and imaginary components (I and Q) of the signal s(t).

The DDFS includes a look-up table which typically stores the same time-domain sample values of the carrier frequencies as the look-up table 67 of the modulator, i.e., $\cos(2\pi f nT)$ and $\sin(2\pi f nT)$. Further processing to recover carrier timing and the like, is performed normally.

Thus, virtually no extra computational complexity is required at the transmitter in order implement frequency diversity for the TPH transmission. A HPNvY receiver has the flexibility to decode the TPH-based on one frequency band, multiple frequency bands, or all of the frequency bands hosting the transmission. The decision regarding TPH frequency decoding, is one that is based on a trade-off between implementational complexity versus reception robustness, and is merely a matter of design choice given a particular home phone line network's characteristics.

In support of the physical layer solution, in accordance with the present invention, a particular MAC protocol has particularly advantages features with respect to its application to the home phone line environment. Whether implemented as a MACvY (28 of FIG. 2) or as an enhanced MAC, or eMAC (36 of FIG. 3), the MAC is targeted towards optimizing network performance when using QPSK/QAM-based physical layer technologies at the physical layer. In order to address backward compatibility issues with lower-level HomePNA standards, it is desirable that the MACvY or eMAC be an independent MAC design. Specifically, a number of MAC protocol schemes are available for a vY or vZ application, including DOCSIS (data over cable interface standard), CSMA/CD (carrier sense multiple access/collision detect, similar IEEE 802.3), token bus (similar to IEEE 802.4), and demand priority (similar to IEEE 802.12).

Although use of any one of these protocol schemes is contemplated by a MAC layer in accordance with the invention, desirably the MAC is constructed to implement a version of the DOCSIS MAC protocol. Particular characteristics of a DOCSIS MAC would include bandwidth allocation handled by a particular headend entity, such as a memory manager, with one particular node taking headend status after winning a contention-based contest between nodes. The data transmission channel, between nodes, is defined as a stream of mini-slots (time slots) wherein data is passed using IEEE 802.1 Ethernet-type data packets. Further characteristics of a DOCSIS MAC, in accordance with the invention, would include quality of service (QoS) support for bandwidth and latency guarantees, such as guaranteed service, predictive service, controlled load and best effort services, as well as packet classification services.

In general, the network layer interfaces to the DOCSIS MAC (vY or vZ MAC), as it would interface to any Etherner-type MAC. The vY or vZ MAC will, in addition, accept coded input to identify quality of service priorities which will be used by the MAC to correctly route and prioritize the MAC output queues. In addition, the vY or vZ MAC will contain coded data that identified its unit type and unit connection requirements. This enables the network layer to find, identify and link to all network nodes that are compatible with its unit type and application. Exemplary unit types might include items such as an audio receiver, a printer, video camera, cable modem and the like. This data will also be stored in tabular form within the MAC, with link messages included in order to facilitate identification and linking with like-capability nodes.

The protocol to be described in greater detail below, is similar to a demand priority protocol, in which a central hub controls network access and data traffic, with all network data traffic from source to destination flowing through the hub. In a demand priority protocol, the hub controls admission to the network, network data access and network data traffic. Network nodes are admitted to the network by sending a request message to the hub via a low-speed channel, typically provided within a separate frequency band such as the first frequency band 40 of FIG. 4, or the alternative frequency band 43 of FIG. 4. Request messages request admission to the network and provides the hub with information related to the requesting node's quality of service (QoS) requirements. Once acknowledged by the hub, the node will be regularly pulled and allow data access to the network at the appropriate time. Polling is generally executed in a round-robin fashion, but due to a particular node's QoS requirements, it may be necessary to poll some nodes more often than others. A demand priority MAC protocol includes a well understood internal routines which translate QoS requirements into a corresponding polling algorithm.

The poll itself consists of a Data Grant message that informs a particular node how many packets it is able to send and the separation that should be placed between sequential data packets. If a particular node has a certain amount of data available, it will begin to transmit data immediately upon receiving the grant. If a particular node does not have sufficient data available to send, it will translate a simple acknowledgment message to the hub containing this information. It should further be noted, herein, that data transmission is typically made over a high-speed data channel, separate and distinct from the control channel. Data packets in a demand priority scheme are addressed to the hub, but also contain the address of the final destination, such that packets may be relayed to the final destination by the hub.

In this particular protocol, data packets are typically separated in time as they are transmitted from a node to the hub and, if time separation is required, the time separation will be at least as large as the time required to send a particular data packet. This degree of separation allows the hub to transmit packets to the destination node over the network between packets being sent by the source node. Once the hub begin to receive packets destined for another node on the network, the hub will begin to transmit the relayed packets to the final destination. The hub addresses the packet to the final destination and places its transmit packets in the time slots provided between its receive packets.

Although the DOCSIS-based MAC protocol, according to the invention, similar to that described for the demand priority protocol, it adds system timing elements which divide the data channel into a stream of time slots (also termed mini-slots), bundles of which are allocated for particular node transmissions on a time allocation basis. Timed access to the channel allows use of contention periods in addition to the demand priority periods. In this regard, the network is configured using a high-speed data channel for data transmissions and a lower-speed channel that is used for MAC management messages and for data services requiring a lower bandwidth. If desired, the high-speed data channel can also be used for communicating MAC management messages. For example, the low-speed channel might be provided by an existing HPNvX physical and MAC layer specification, as described above, or by a separate low-speed channel unique to an HPNvY node. This low-speed channel would utilize a MAC protocol similar to that used in vX applications.

The high-speed data channel incorporates a physical layer derived from DOCSIS-based QPSK and 16-QAM, or higher, technologies. The MAC layer for the high-speed channel, defined herein, further utilizes the concept of a network manager which manages all timing, node access and bandwidth allocation for the network. The basic mechanism used by the network manager for bandwidth management of the high-speed data channel is a bandwidth allocation map, having a format similar to that defined in the DOCSIS Data-Over-Cable Radio Frequency Interface Specifications SP-RFII01-970326 (SP-RFI) May 6, 1997.

Available bandwidth is divided into a stream of mini-slots, with each mini-slot numbered relative to a master reference, maintained by a network manager device. The allocation map is a MAC management message, issued by the network manager, which describes, for some interval, specific uses for various channel mini-slots. A given map may, for example, define some slots as grants for particular nodes to use for transmitting data. Other slots might be defined as being available for contention transmissions, and additional slots as providing an opportunity for new nodes to be added to the network. Slots are defined in a similar manner to slot definition for a DOCSIS upstream channel, but, the bandwidth allocation map in accordance with the invention includes information showing both the source and the destination node addresses along with slot allocation to those nodes.

In particular, a mini-slot size (identified herein as T) is defined in units of a standard timebase tick, with each timebase tick being of approximately 6.25 microsecond duration. Only certain slot sizes T are allowed, with specific values defined by a two's power relationship, i.e., allowable values of $T=2^M$, where $M=1, 2, \ldots, 7$. Accordingly, micro-slot size T can be 2, 4, 8, 16, 32, 64 or 128 time ticks in length.

Figure 8:
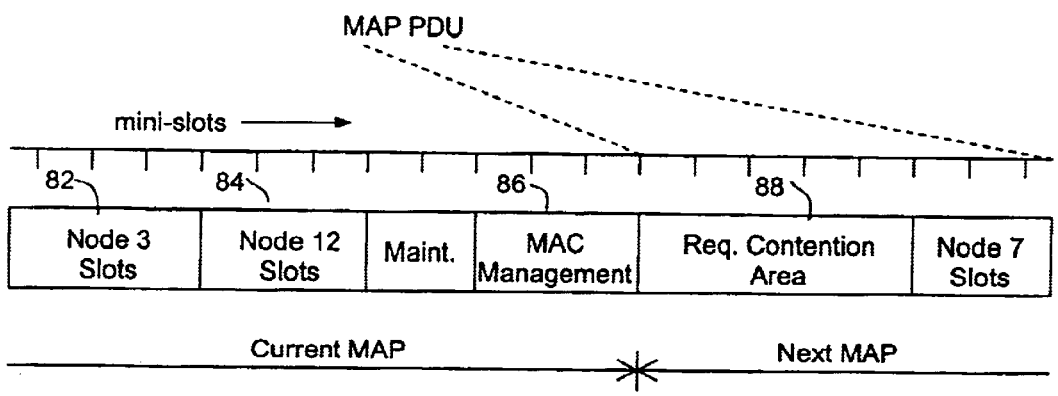
FIG. 8 is a simplified allocation map diagram, in accordance with the invention.
Figure 9:
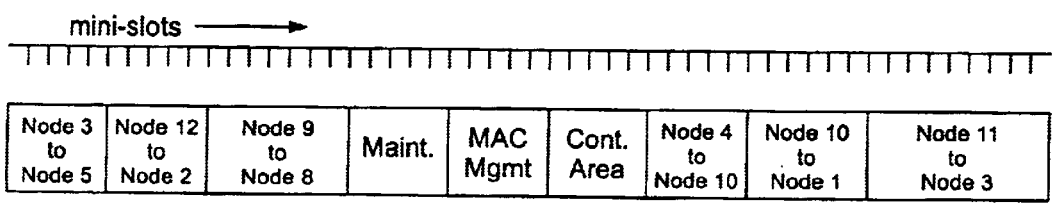
FIG. 9 is a simplified, semi-schematic access interval diagram, illustrating slot allocation in accordance with the allocation map of FIG. 8.

An exemplary bandwidth allocation map is depicted in semischematic form in FIG. 8, and an example of how particular slots might be allocated in accordance with the allocation map is depicted in a semi-schematic form in FIG. 9. In FIG. 8, certain numbers of mini-slots 80 have been identified as corresponding to certain network nodes, identified as node 3, node 7 and node 12, as well as being identified to a MAC management message and to a contention area. In the exemplary embodiment of FIG. 8, at least three mini-slots are allocated as belonging to node 3 82, with the next three mini-slots allocated to node 12 84. Three mini-slots have been allocated to a MAC management message 86, followed by five mini-slots being allocated to a contention area 88.

FIG. 9 depicts an exemplary slot allocation that might be generated by a network manager once the source and destination node addresses are established. In the exemplary embodiment of FIG. 9, node 10 has been identified as the network manager after the network manager contention procedure. Exemplary connections and slot allocations for the various nodes might be from node 3 to node 5, from node 12 to node 2, node 9 to node 8, and with two examples of a node 4 transmission; a node 4 to node 6 direct transmission and a node 4 to node 1 transmission through the network manager, node 10. Interspersed with the connection and slot allocations are the slot allocations for MAC management messages and a slot allocation for a contention area.

In accordance with the invention, the network must have one, and only one, network manager. The network manager is responsible for defining the timing for the network (defining mini-slot timebase ticks) and allocating bandwidth-to-network nodes based upon allocation requests. Each node on the network should, desirably, be capable of functioning as a network manager, but alternatively, each node on the network could be configured ahead of time as either a simple node or as a possible network manager node by manipulating either a jumper or a dip switch on a NIC card, for example. In addition, network nodes might be able to define and utilize a NIC configuration message that defines the capability of the node as a potential network manager node, or as the sole network manager node. In the case of multiple nodes having the capability of functioning as a network manager, a contention algorithm is utilized such that each node may contend for the position of network manager. Once a node has been identified as a network manager, the node serving as network manager must generate the time reference for identifying channel mini-slots. The time reference generation is well understood and has been defined in the DOCSIS space SPRFI specification and need not be further elaborated herein. It is sufficient that any particular HPNvY or HPNvZ node, incorporating a MACvY, MACvZ, or eMAC, in accordance with the invention, incorporate the necessary functionality required by the BOCSIS specification in order to function as a time reference generator and network manager.

Once a network manager has been identified, the network must be initialized. An initial step in configuring the network is the process of identifying each network node and discovering its particular type and its operational status. This process is termed node discovery. In the low-speed channel, the network manager executes a process to discover the nodes on the network. A broadcast message is sent over the network which requests that each unidentified network node identify itself to the network manager. The request message contains the MAC address, node address and product type of each node that has already been recognized, such that only unidentified network nodes need reply.

To reply to the request message, each unidentified network node will contend for the network an wait to be recognized by the network manager. The completion of each round of contention results in a further node discovery request from the network manager. A change in a node's status from unrecognized to recognized will be acknowledged, by having its MAC address included in the request message along with a newly assigned node address. This process continues until no further unidentified nodes respond to the discovery request.

Newly discovered nodes, replying to a request message, will also provide the network manager with "node type" information, i.e., information related to the type and characteristics of the node. As is well understood by those having skill in the art, each node is typically configured with a ROM including these parameters. A node need only access the contents of its ROM and provide such information to the network manager as "node type" data. Such data typically includes a node's model number, software version, product type (such as cable modem, MPEG player or receiver, audio player or receiver, video camera, personal computer, and the like) and an indication of various special capabilities.

Following discovery, each node maintains is newly assigned node address (node identifier) provided by the network manager during initialization. In addition, each node maintains a list of all other nodes, on the network, with functionality compatible with its own. For example, an MPEG player node will maintain the node address (identifier) and parameter characteristics for an MPEG receiver, a cable modem and/or a personal computer, in addition to its own ROM content.

After each node on the network is discovered and assigned a node address, the node is considered to be active and ready to transmit or receive data. However, in order to become an active network participant, a node is required to first request service. Until this time, a node routinely monitors network traffic in order to receive any relevant broadcast messages, i.e., network management messages related to a new node trying to connect to the network.

Because each network node is continually monitoring network traffic flow and can thus see transmission traffic of every other node, it is unnecessary for the network manager to function as a headend (cable modem termination system; CMTS as in a DOCSIS network) to relay all data communication between nodes. Based on the network allocation map, a node is able to use its assigned mini-slots to address data packets directly to the intended destination node. However, this particular connection methodology will require the two nodes to execute ranging and equalizer training in order to connect, so this particular mode of connection but it should be limited to cases where the two nodes will be maintaining a connection over time.

In order to support the MAC protocol in accordance with the invention, each node must have reference to a global system of time. The network manager creates a network timing reference by transmitting a Time Synchronization (SYNC) MAC management message that is broadcast on the network in a corresponding allocation of mini-slots. The MAC management message contains a timestamp that exactly identifies when the network manager transmitted the message. Upon receipt of the timestamp, each node will compare the actual time it marks the SYNC message as received with the timestamp that marks when the SYNC message was transmitted. The receiving node will thereafter adjust its local time clock to match the timestamp.

In the DOCSIS configuration, the node (a cable modem, for example) must compensate for the delay incurred while the SYNC message is transmitted from the headend (network manager). Delay timing is calculated during the ranging process. In a home phone line network, the network configuration is typically small and the end-to-end delay from the two furthest nodes is also small. If one assumes that the two furthest nodes are 1,000 feet apart (a particular limitation of the physical layer architecture of the HomePNA v2 standard), a propagation delay for unshielded twisted pair wiring of approximately 1.5 ns per foot, amounts to a worst case delay of approximately 1.5 microseconds. This value is considerably smaller than a data transmission burst and also considerably smaller than the 6.25 microsecond period of the timing clock (a timebase tick). Therefore, timing correction for transmission delay is not required in the MAC protocol in accordance with the invention.

Further, the distance between SYNC messages is adjustable, but will be in the range of about tens of milliseconds. A node must acquire SYNC with the network manager before it is able to transmit information onto the network. A node achieves MAC synchronization once it has received two consecutive SYNC messages and has verified that its local time clock tolerances are within specified limits. The node remains in sync as long as it continues to successfully receive SYNC messages.

Figure 10:
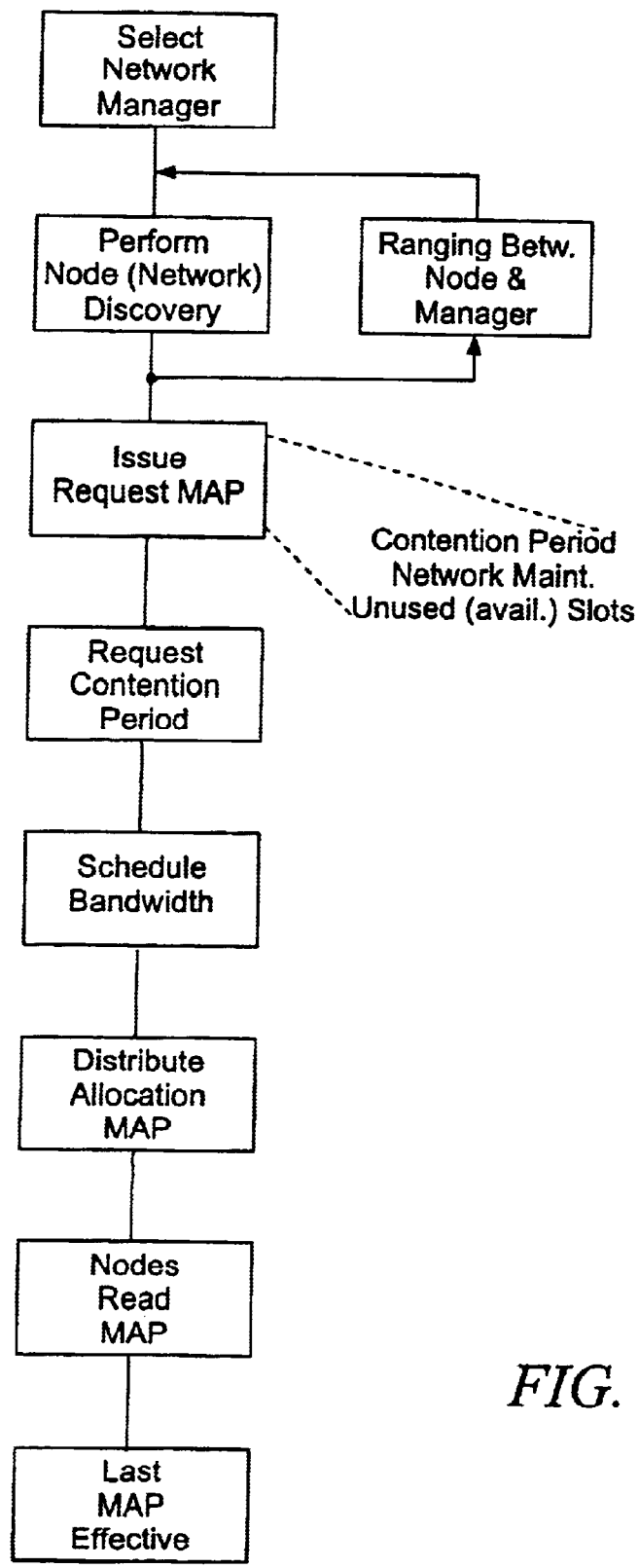
FIG. 10 is a simplified operational flow diagram of a communication protocol in accordance with the present invention.

The operational flow of the MAC protocol in accordance with the present invention, is discussed in connection with an exemplary operational flow diagram depicted in FIG. 10. According to the operational flow of the invention, the network manager node is selected, either by a hard wire definition, a NIC configuration message or through a contention procedure between all network manager capable nodes. Once the network manager is selected, the network manager takes control of the network and performs a node discovery process, as was described above. Because a node discovery process involves bi-directional communication between a network manager and an individual node, ranging is individually performed between each network node and the network manager, in order to maintain data transmission integrity.

At the conclusion of the discovery process, the network manager is now familiar with all of the nodes coupled to the network and has identified each node with its unique node address, or identifier. The network manager next develops and transmits a bandwidth allocation map to the nodes comprising the network, defining contention periods, network maintenance periods and currently unused slots that are available for packet transmission between nodes. Network nodes acquire network sync with the network manager timing reference and enter into bandwidth contention during the first available contention period defined in the allocation map. During this contention period, nodes might request continuous bandwidth to connect and communicate with other individual nodes or might request certain slots for communication with other nodes through the network manager. For example, node 1 might request continuous bandwidth to connect to node 2, while node 3 requests a specific slot allocation for communication with node 4 via the network manager. After receipt of bandwidth requests, the network manager schedules bandwidths and distributes a bandwidth allocation map during the network maintenance period. For example, using the exemplary requests noted above, a network manager might schedule a node 1 to node 2 communication session utilizing a certain number of slots (n through n+x). For the node 3 to node 4 communication, the network manager might schedule packet communication from node 3 to the network manager using even numbered slots (m through m+x) and packet communication from the network manager to node 4 might be scheduled using the interspersed odd numbered slots.

The bandwidth allocation map is received and read by the individual network nodes which, in turn, prepare to transmit during their assigned slots, in accordance with the network manager defined timing reference. At the end of the network maintenance period, the last sent map becomes effective and the node having the first slot allocation ranges and performs training with its corresponding receive node before regular communication can proceed.

During contention periods, defined for such purpose, additional nodes may request bandwidth allocation, and intermittently, new nodes might request network access via the low-speed channel simultaneously with data transmission between nodes over the high-speed data channel. It should be understood that continuous connection slots are maintained across multiple cycles, forcing nodes requiring continuous bandwidth to periodically request new bandwidth allocation on a cycle-by-cycle basis. Similarly, continuous connection nodes must close their connection through the network manager either during the contention period or by a status message provided over the lowspeed channel.

Thus, it can be seen that the MAC protocol according to the invention supports various desirable features that can be implemented in a home telephone line network environment. In particular, desirable protocol features include bandwidth. allocation controlled by a network node functioning as a network manager and implemented as a stream of mini-slots in both the upstream and downstream directions. Bandwidth efficiency is enhanced by a mix of contention-based transmit opportunities and support variable-length packets, as well as quality of service support. The MAC sub-layer domain is, therefore, a collection of upstream and downstream channels for which a single MAC allocation and management protocol operates. The network configuration includes a network manager node and some number of other network nodes with the network manager servicing all of the upstream and downstream channels. Each other network node may access one or more upstream and downstream channel.

Those skilled in the art will recognize that the above descriptions of exemplary embodiments of overlaid logical networks, novel HPNvX and HPNvY nodes useful in connection thereto, and PHY frame structure that is able to enhance throughput by reducing overhead in higher-order bi-directional communication architectures, are for illustrative purposes and can be implemented in a variety of ways, using a variety of techniques, without departing from the scope and spirit of the present invention. Because of variations which will be apparent to those skilled in the art, the present invention is not intended to be limited to the particular embodiments described above. Such variations and other modifications and alterations are included within the scope and intent of the invention as described in the following claims.

What is claimed is:

1. A system for establishing a plurality of logical networks over a common unshielded twisted pair communication medium, comprising:

a first frequency band associated with a first communication protocol;

a second frequency band associated with a second communication protocol;

a first pair of bidirectional communication nodes;

a second pair of bidirectional communication nodes, each node of both the first and second pairs having a first physical layer device configured to operate in accordance with the first communication protocol and a second physical layer device configured to operate in accordance with the second communication protocol; and wherein the first pair of nodes communicates with one another through their respective first physical layer devices over the first frequency band, and wherein the second pair of nodes simultaneously communicates with one another through their respective second physical layer devices over the second frequency band.

2. The system according to claim 1, each node further comprising:

medium access layer means for establishing communication over the unshielded twisted pair communication medium in accordance with the first and second communication protocols; and wherein each network node being capable of bidirectionally communicating over the unshielded twisted pair communication medium using either the first or second communication protocols independently.

3. The system according to claim 2, wherein the first communication protocol is characterized by a first particular data rate, and wherein the second communication protocol is characterized by a second particular data rate greater than the first data rate.

4. The system according to claim 3, wherein the first frequency band occupies a first portion of a frequency spectrum, and wherein the second frequency band occupies a second portion of the frequency spectrum higher than the first portion.

5. The system according to claim 4, further comprising:

a third frequency band; and wherein a pair of bidirectional communication nodes being capable of establishing communication over the unshielded twisted pair communication medium through their respective second physical layer devices over the third frequency band.

6. The system according to claim 5, wherein the third frequency band overlaps the first and second frequency bands.

7. The system according to claim 5, wherein the third frequency band is contained within the first frequency band.

8. The system according to claim 5, wherein a pair of bidirectional communication nodes establish communication over the unshielded twisted pair communication medium through their respective second physical layer devices over the third frequency band in accordance with the first communication protocol.

9. In a bidirectional communication device of the type adapted to communicate information over an unshielded twisted pair communication medium, a network node system comprising:

a first physical layer device configured to transmit and receive information modulated in accordance with a first communication standard;

a second physical layer device configured to transmit and receive information modulated in accordance with a second communication standard;

medium access layer means for establishing communication over the unshielded twisted pair communication medium in accordance with first and second communication protocols; and wherein the network node being capable of bidirectionally communicating over the unshielded twisted pair communication medium using either the first or second communication protocols independently.

10. The local area network node system in accordance with claim 9, further comprising:

a first frequency band associated with the first communication protocol;

a second frequency band associated with the second communication protocol; and wherein the medium access layer means bidirectionally communicating over the unshielded twisted pair communication medium using either the first or second frequency bands independently.

11. The local area network node system in accordance with claim 10, wherein the first physical layer device communicates information in accordance with the first communication standard over the first frequency band, and wherein the second physical layer device communicates information in accordance with the second communication standard over the second frequency band.

12. The local area network node system in accordance with claim 10, wherein the medium access layer means further comprises:

a first medium access layer device configured to support communication in accordance with the first communication protocol; and a second, independent medium access layer device configured to configured to support communication in accordance with the second communication protocol.

13. The local area network node system in accordance with claim 10, wherein the medium access layer means further comprises a medium access layer device constructed to support communication in accordance with the first and second communication protocols, the first and second physical layer devices coupled to the medium access layer device through a select circuit.

14. The local area network node system in accordance with claim 10, wherein a first pair of network nodes communicates with one another through their respective first physical layer devices over the first frequency band, and wherein a second pair of network nodes simultaneously communicates with one another through their respective second physical layer devices over the second frequency band.

15. The local area network node system in accordance with claim 11, further comprising:

a third frequency band; and wherein a pair of network nodes being capable of establishing communication over the unshielded twisted pair communication medium through their respective second physical layer devices over the third frequency band.

16. The local area network node system in accordance with claim 15, wherein the third frequency band overlaps the first and second frequency bands.

17. The network node system in accordance with claim 15, wherein the third frequency band is contained within the first frequency band.

18. The network node system in accordance with claim 15, wherein a pair of network nodes establish communication over the unshielded twisted pair communication medium through their respective second physical layer devices over the third frequency band in accordance with the first communication protocol.

19. The local area network node system in accordance with claim 15, wherein a first pair of network nodes communicates with one another through their respective second physical layer devices over the second frequency band, and wherein a second pair of network nodes simultaneously communicates with one another through their respective second physical layer devices over the third frequency band.

20. A method for establishing a plurality of logical networks over a common unshielded twisted pair communication medium, comprising:

defining a first frequency band associated with a first communication protocol;

defining a second frequency band associated with a second communication protocol;

coupling a first pair of bidirectional communication nodes to the communication medium;

coupling a second pair of bidirectional communication nodes to the communication medium, each node of both the first and second pairs having a first physical layer device configured to operate in accordance with the first communication protocol and a second physical layer device configured to operate in accordance with the second communication protocol; and wherein the first pair of nodes communicates with one another through their respective first physical layer devices over the first frequency band, and wherein the second pair of nodes simultaneously communicates with one another through their respective second physical layer devices over the second frequency band.

21. The method according to claim 20, further comprising:

providing medium access layer means for establishing communication over the unshielded twisted pair communication medium in accordance with the first and second communication protocols; and communicating over the unshielded twisted pair communication medium using either the first or second communication protocols independently, under control of the medium access layer means.

22. The method according to claim 21, wherein the first communication protocol is characterized by a first particular data rate, and wherein the second communication protocol is characterized by a second particular data rate greater than the first data rate.

23. The method according to claim 22, wherein the first frequency band occupies a first portion of a frequency spectrum, and wherein the second frequency band occupies a second portion of the frequency spectrum higher than the first portion.

24. The method according to claim 23, further comprising:

defining a third frequency band; and establishing communication over the unshielded twisted pair communication medium, between a pair of bidirectional communication nodes, through their respective second physical layer devices over the third frequency band.

25. The method according to claim 24, wherein the third frequency band overlaps the first and second frequency bands.

26. The method according to claim 24, wherein the third frequency band is contained within the first frequency band.

27. The method according to claim 24, wherein a pair of bidirectional communication nodes establish communication over the unshielded twisted pair communication medium through their respective second physical layer devices over the third frequency band in accordance with the first communication protocol.

* * * * *

UNITED STATES PATENT AND TRADEMARK OFFICE
CERTIFICATE OF CORRECTION

PATENT NO. : 6,868,072 B1
DATED : March 15, 2005
INVENTOR(S) : Lin et al.

It is certified that error appears in the above-identified patent and that said Letters Patent is hereby corrected as shown below:

Title page,
Item [56], References Cited, FOREIGN PATENT DOCUMENTS, delete "WO WO 99/12330 * 11/1999................ H04M/11/06".
OTHER PUBLICATIONS, delete "Chow, et al., "A Multi-drop In-house ADSL Distribution Network", Amati Communications Corporation, IEEE, 1994, pp. 456-460. *".

Column 23,
Line 49, after "frequency band, and", insert -- , simultaneously --.
Line 50, after "nodes", delete "simultaneously".

Column 24,
Line 26, after "medium, a", insert -- local area --.
Line 66, delete "configured to configured to" insert -- configured to --.

Column 25,
Line 27, after "The", insert -- local area --.
Line 30, after "The", insert -- local area --.

Signed and Sealed this

Twenty-third Day of August, 2005

JON W. DUDAS
*Director of the United States Patent and Trademark Office*